May 2, 1961

N. R. HASKELL 2,982,311

PLASTIC PIPE LINER

Filed April 18, 1956

INVENTOR.
Norman Revel Haskell
BY

ATTORNEY

United States Patent Office 2,982,311
Patented May 2, 1961

2,982,311

PLASTIC PIPE LINER

Norman Reuel Haskell, Tulsa, Okla., assignor to Plastic Insert Lining Company, Tulsa, Okla., a corporation of Oklahoma Filed Apr. 18, 1956, Ser. No. 578,975

2 Claims. (Cl. 138—100)

This invention relates to lined pipe and more particularly, but not by way of limitation, to a plastic liner for flow lines carrying corrosive compounds, such as hydrocarbons and the like.

Flow lines, such as metallic pipe lines conveying petroleum products, are often buried in the ground and extend over great distances. The chemical activity of the fluid flowing through the pipe line is usually highly corrosive and will cause serious damage to the inner periphery of the metallic pipe. Furthermore, paraffin present in the liquid petroleum products tends to congeal as the liquid cools, and accumulates on the inner walls of the pipe line. It is a costly and difficult task to remove damaged or restricted pipe sections for cleaning or replacement thereof after they have been installed for utilization. Therefore, it is common practice to paint or otherwise coat the interior of the pipe line with a suitable non-corrosive substance prior to the installation thereof in the earth. This is usually an arduous process and often is ineffective for reducing paraffin accumulations on the inner periphery of the pipe.

The present invention contemplates a plastic liner for pipe lines which is comparatively simple to install within the pipe, and may be disposed within the pipe at the location of usage thereof, if desired. The plastic liner resists the corrosive action of fluids flowing therethrough and thus protects the inner periphery of the metallic pipe from the detrimental aspects thereof. The physical and chemical properties of the plastic are such that paraffin will not adhere to any great extent to the surfaces thereof. Thus, the plastic liner not only prevents corrosive damage to the interior of the pipe line, but also substantially precludes any restriction of flow therethrough caused by an accumulation of paraffin. Furthermore, the plastic pipe liner is so designed and constructed to preclude the necessity of an additional gasket or sealing member at the pipe joint wherein the liner is anchored to the pipe line.

It is an important object of this invention to provide a novel plastic liner for flow lines which may readily be inserted therein to provide corrosive protection for the interior of the pipe and reduce restriction of flow therethrough caused by accumulations of paraffin.

It is another object of this invention to provide a novel plastic liner for flow lines which eliminates the necessity of additional sealing members at the pipe joint wherein the liner is anchored within the pipe line.

It is still another object of this invention to provide a novel plastic liner for flow lines so designed and constructed to facilitate the coupling together of sections thereof in tandem relation to provide a continuous liner of substantially any desired length.

It is a further object of this invention to provide a novel plastic pipe liner so designed and constructed to compensate for stretching or shrinkage of the plastic material in either a transverse or a longitudinal direction.

It is a still further object of this invention to provide a plastic liner for flow lines which is simple in operation and durable and economical in construction.

Other objects and advantages of the invention will be evident from the following detailed description, read in conjunction with the accompanying drawings, which illustrate my invention.

Figure 1:
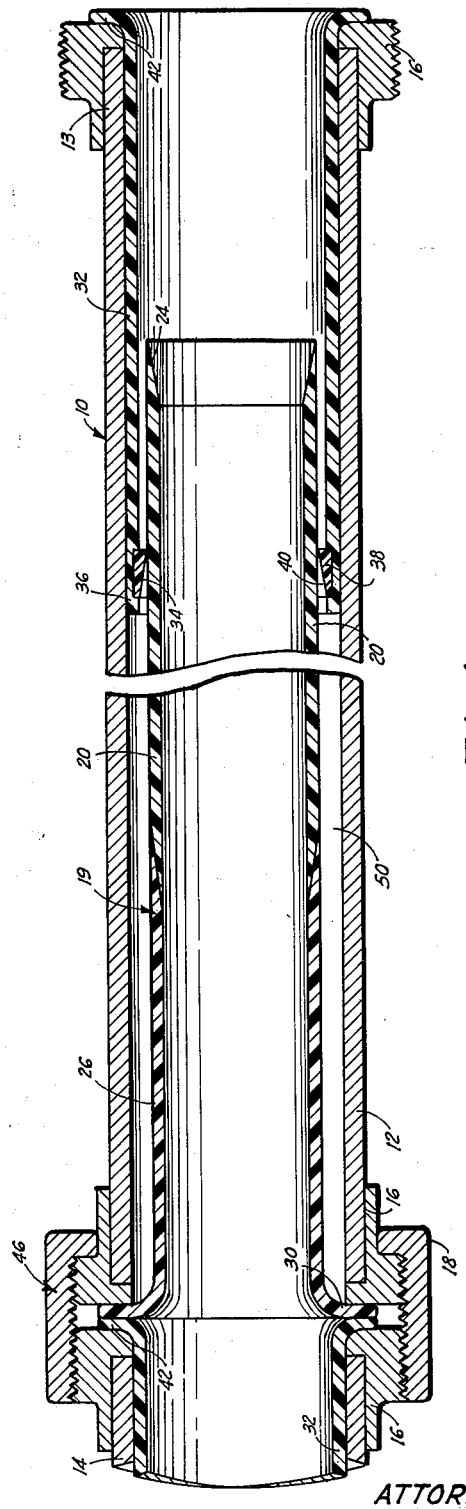
Figure 1 is a longitudinal sectional view of a flow line provided with a liner embodying the invention.
Figure 2:
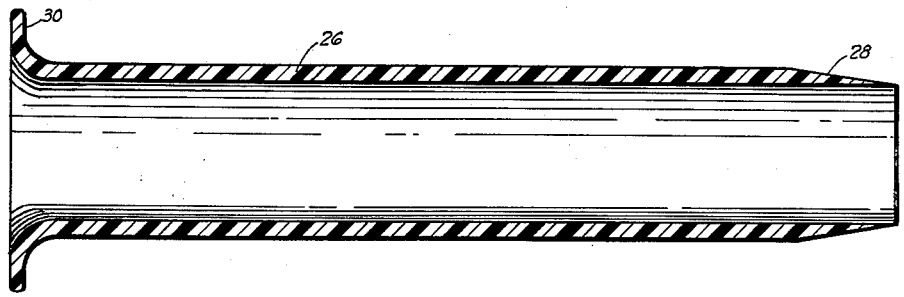
Figure 2 is a longitudinal sectional view of the anchor section of the novel pipe liner.

Referring to the drawings in detail, reference character 10 refers in general to a flow line or pipe line adapted to carry corrosive fluids, such as hydrocarbons and the like. Pipe lines are usually very long and comprise a plurality of pipe sections 12 and 14 coupled together in tandem relation. The pipe sections may be coupled together in any suitable manner, such as an externally threaded sleeve member 16 rigidly secured to the opposite end portions of the pipe section to receive an internally threaded union member 18 for securing the adjacent sleeve members 16, as clearly shown in Fig. 1, and well known in the industry.

Figure 3:
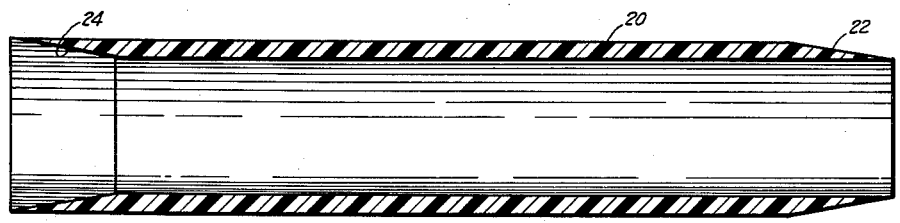
Figure 3 is a longitudinal sectional view of a typical liner section of the invention.
Figure 4:
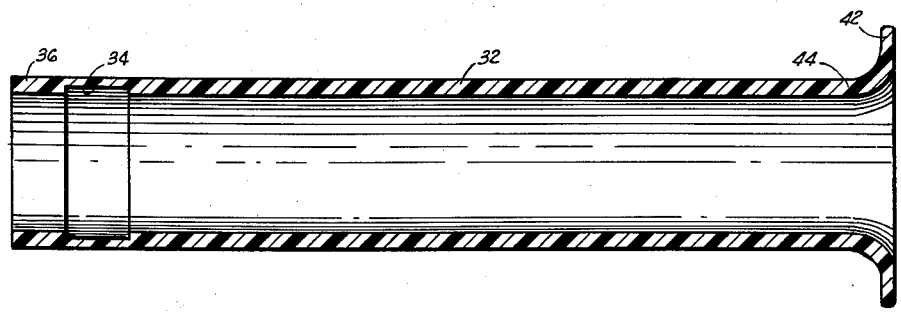
Figure 4 is a longitudinal sectional view of the expansion joint member of the invention.

The novel pipe liner, generally indicated at 19, is of substantially tubular configuration and comprises a plurality of tubular sections 20 of a slightly smaller diameter than the inside diameter of the pipe sections 12 and 14 and is preferably made of a suitable plastic material, such as is known by the trade name of Tenite or the like, and secured in tandem relation as will be hereinafter set forth. Each section 20 is provided with a tapered portion 22 (Fig. 3) around the outer periphery of one end thereof. A tapered portion 24 is provided on the inner periphery of the opposite end of the section 20. The taper 24 is of substantially the same angular disposition as the taper 22 for receiving the tapered portion 22 of an adjacent section 20 positioned in tandem relation thereto.

The coupled liner sections 20 extend substantially throughout the length of the pipe line 10. It is necessary, however, to secure the liner sections 20 within the pipe line 10 at intervals such as between the sections 12 and 14. For this purpose an anchor section 26 is provided. The anchor member 26 is substantially tubular and of the same diameter as the sections 20, and is constructed from the same material. An external tapered portion 28 is provided around the outer periphery of one end of the anchor member 28 and is substantially identical to the taper 22 of the sections 20 in order to mate with the taper 24 of an adjoining section 20 as will be hereinafter set forth. The opposite end of the anchor portion 26 is provided with an outwardly extending circumferential flange member 30. The flange 30 is adapted to be disposed adjacent the open end of the threaded sleeve member 16 at one end of the pipe section 12 as shown in Fig. 1 to retain the liner 19 longitudinally within the pipe line 10 in a manner as will be hereinafter set forth.

An expansion joint member 32 is provided for the liner 19 and is preferably spaced at intervals within the pipe line 10 as required, such as at a pipe section end portion 13 shown at the right hand portion of Fig. 1. The expansion member 32 is a tubular member of a slightly larger diameter than the liner sections 20, and is constructed from the same plastic material. An annular groove 34 is spaced slightly from one end 36 of the expansion member 32 to receive a sealing member 38 (Fig. 1). The sealing member 38 is preferably made of neoprene or the like and is provided with a tapered inner surface 40 to facilitate insertion of a liner section 20 within the expansion joint member 32 to wedge the section 20 securely therein for an efficient sealing therebetween. The gasket 38 may be in the form of an O-ring seal (not shown) if desired. The expansion joint member 32 is provided with an outwardly extending circumferential flange member 42 at the opposite end 44 thereof, and which is adapted to be disposed adjacent the sleeve member 16 secured to the end portion 13, as clearly shown in Fig. 1, for securing the expansion joint member 32 within the pipe line 10. The expansion member 32 is preferably of a length such that a liner section 20 will extend substantially half way therethrough to compensate for longitudinal expansion and contraction of the plastic liner 19. Thus, the liner 19 comprises a plurality of the sections 20 secured in tandem relation, and is provided with an anchor section 26 and an expansion joint member 32 interposed at intervals therein as required to secure the liner 19 within the pipe line 10. Normally, an expansion joint member 32 will be in abutment with an anchor member 26, as shown in Fig. 1 at the pipe joint between the pipe sections 12 and 14. Thus, a tightening of the two pipe sections 12 and 14 will compress the flange members 30 and 42 together to securely hold the liner 19 within the pipe 10 and to provide an efficient sealing of the pipe joint, thereby eliminating the need for additional sealing members at the pipe joint wherein the liner 19 is anchored.

In order to secure a plurality of the liner sections 20 together to provide a liner 19 of the desired length, the tapered surface 22 of one section 20 is inserted within the tapered portion 24 of an adjacent section 20. The tapered surfaces 22 and 24 are cemented together by a suitable glue or cementing material (not shown) which is preferably made of the same plastic material as the sections 20 with a suitable solvent added thereto for fluidity. The glue dries or sets up quickly and the two adjacent liner sections 20 are fused together as one piece. Thus, the joint therebetween is as strong as the rest of the liner. The sections 20 are preferably secured in tandem relation in this manner to provide a tubular liner of slightly less length than the length of the pipe sections wherein it is to be utilized.

To insert the liner 19 within the pipe line 10, a pipe line scraping tool or pig (not shown) is forced longitudinally through the pipe line in any suitable manner well known in the industry. A winch line or cable (not shown) is secured to the pig before the pig is run through the pipe line, and is carried therethrough as the pig travels the length of the pipe. The pig is then removed and the winch line is suitably secured in the proximity of the tapered portion 24 at one end of a plurality of the coupled liner sections 20. The winch line is then utilized in any well known manner (not shown) to pull the connected sections 20 longitudinally through the portion of the pipe 10 being lined. It is preferable to line the pipe line in lengths that facilitate the handling thereof, and couple the lined portions together in a manner as will be hereinafter set forth.

When it is desired to interpose an expansion joint member 32 in the liner 19, the liner sections 20 are pulled into the pipe as hereinbefore set forth until the tapered portion 22 of the last section 20 being disposed within the pipe extends from the open end of the pipe a distance substantially half the length of the expansion member 32. The member 32 is telescopically disposed over the exposed portion of the liner 19. The external tapered portion 22 of the section 20, and the tapered inner surface 40 of the gasket member 38 cooperate to facilitate the telescopic disposition of the member 32 on the liner section 20. As hereinbefore set forth, the section 20 extends longitudinally substantially half way through the expansion members 32 to compensate for any expanding or contracting of the plastic material from which the liner is constructed. The gasket 38 wedges the extension member 32 securely on the section 20 and provides an efficient sealing therebetween. The winch line is again utilized to pull the liner sections 20 and the expansion member 32 secured thereto into the pipe line 10. The outer diameter of the member 32 is substantially the same as the inner diameter of the pipe 10. It will be apparent, therefore, that a slight manual manipulation will be required to insert the end 36 into the pipe in order that the winch line will pull the extension member 32 into the pipe and not withdraw the section 20 therefrom. The flexibility of the plastic material facilitates the manipulation of the liner being inserted into the pipe. The winch line thus pulls the expansion joint member 32 into the pipe 10 until the flange 42 is in abutment adjacent the threaded sleeve member 16 secured to the end of the pipe portion being lined.

It is desirable to provide an anchor section 26 on the opposite end of the assembled sections 20 to secure the liner 19 within the pipe line portion. The winch line is used to pull the sections 20 secured thereto through the pipe line to the open end of the pipe oppositely disposed from the installed expansion joint member 32, wherein it is desired to insert the anchor section 26. The leading section 20 being pulled through the pipe is brought beyond the open end of the pipe 10 a sufficient distance to permit the tapered portion 28 of the anchor 26 to be disposed within the tapered portion 24 of the section 20 and securely glued or cemented thereto in a manner similar to the cementing together of the sections 20 as hereinbefore set forth. When the anchor section 26 is secured to the liner section 20, the entire length of the connected sections 20 and the anchor section 26 are moved toward the right (Fig. 1) in the pipe line 10 until the flange 30 is in abutment adjacent the sleeve 16. The sections 20 will move telescopically within the expansion member 32 during this operation. The amount of overlap of the sections 20 and the member 32 is sufficient, however, to preclude withdrawal of the sections 20 therefrom while the anchor 26 is being secured to the sections 20.

In this manner the selected pipe line lengths may be lined, and the process is repeated until a plurality of the lengths has been lined with the plastic liner 19. The pipe line lengths are coupled in tandem relation at a pipe joint, such as 46 (Fig. 1) by the union members 18 as hereinbefore set forth. Normally the adjacent pipe sections 12 and 14 have an anchor section 26 extending from the one pipe section 12 and an extension member 32 extending from the opposed pipe section 14, as clearly shown in Fig. 1. It will be apparent that a tightening of the joint 46 will compress the flange members 30 and 42 to secure the liner 19 within the pipe 10 and will provide an efficient seal at the pipe joint thereby eliminating the need for additional sealing members at the joint 46.

The liner 19 is designed for use in low pressure flow lines subjected to pressures of approximately fifty pounds per square inch, but the plastic tubing constructed as shown herein will withstand surges of substantially high pressure without damage or leakage thereof. The physical characteristics of the plastic as utilized herein are such that both longitudinal and transverse fluctuations of size may occur. The most serious of these is the longitudinal creeping of the tubing. The expansion joint 32 compensates for longitudinal fluctuations or creeping as hereinbefore set forth. The inner diameter of the pipe 10 limits the outward flexing of the walls of the liner 19. However, the annular space 50 between the sections 20 and the pipe 10 provides for a certain amount of flexibility of the liner 19 during utilization thereof. In actual usage the outer periphery of the liner 19 is usually flexed outward into a disposition adjacent the inner periphery of the pipe 10. The wall thickness of the liner 19 is exaggerated in the drawings, and is normally only a few thousandths of an inch thick. It is further contemplated, however, that the liner 19 may be sufficiently re-enforced to be utilized as a plastic flow line independent of the metallic pipe line 10.

From the foregoing, it will be apparent that the present invention contemplates a novel plastic liner for metallic pipe lines or flow lines adapted to carry corrosive fluid such as petroleum products, and the like. The novel liner may be easily installed within the pipe line, and is provided with an anchoring member for securing the liner within the pipe. The liner is further provided with an expansion joint member to compensate for the longitudinal creeping or fluctuating of the plastic tubing. The plastic liner resists the corrosive action of fluids flowing therethrough, and thus protects the inner periphery of the metallic pipe line from the adverse effects thereof. Furthermore, paraffin present in the petroleum products will not adhere to any great degree to the surface of the plastic tubing, thereby precluding serious accumulation thereof on the inner periphery of the pipe. Thus, the novel plastic liner greatly prolongs the useful life of the metallic pipe line and reduces expensive maintenance thereof.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A plastic liner for pipe lines, said pipe lines having pipe sections coupled together at pipe joints, said liner comprising a plurality of tubing members secured in tandem relation, each of said tubing members having one end thereof provided with a tapered surface around the outer periphery and the opposite end being provided with a tapered surface around the inner periphery thereof, the inner tapered surface of one tubing member being adapted to receive the outer tapered surface of an adjacent tubing member for coupling thereof in said tandem relation, a tubular anchor member as part of the liner, said anchor member being provided with a tapered surface adjacent one end thereof for receiving one of the tubing members, an outwardly extending circumferential shoulder provided on the opposite end of the anchor member for securing the liner at a pipe joint, a tubular expansion joint member to be interposed at each pipe joint in abutting relation to the anchor member and of a larger diameter than the tubing members for slidably receiving one of the tubing members therein, an outwardly extending circumferential flange provided at one end of the expansion joint member to secure the liner at a pipe joint in said abutting relation, and sealing means provided between the expansion joint member and the tubing member disposed therein for sealing therebetween regardless of longitudinal variations of the tubular members.

2. A plastic liner for pipe lines, said pipe lines having pipe sections coupled together at pipe joints, said liner comprising a plurality of tubular members secured in tandem relation, each of said tubing members having one end thereof provided with a tapered surface around the outer periphery and the opposite end being provided with a tapered surface around the inner periphery thereof, the inner tapered surface of one tubing member being adapted to receive the outer tapered surface of an adjacent tubing member for coupling thereof in said tandem relation, a tubular anchor member as part of the liner, said anchor member being provided with a tapered surface adjacent one end thereof for receiving a tubing member, an outwardly extending circumferential shoulder provided on the opposite end of the anchor member for securing the liner at a pipe joint, a tubular expansion joint member as part of the liner to be interposed at each pipe joint in abutting relation to the anchor member and of a larger diameter than the tubing members for slidably receiving a tubing member therein, an outwardly extending circumferential flange provided at one end of the expansion joint member to secure the liner at a pipe joint, a sealing member provided between the tubing and expansion joint members, said sealing member provided with a tapered surface to securely wedge the expansion joint member and tubing member together in a sealed position regardless of any longitudinal variations in the tubular members.

References Cited in the file of this patent

UNITED STATES PATENTS

| | | |
|---|---|---|
| 330,873 | Cobb | Nov. 24, 1885 |
| 714,903 | Hinds | Dec. 2, 1902 |
| 942,184 | Persons | Dec. 7, 1909 |
| 1,824,838 | Root | Sept. 29, 1931 |
| 1,987,372 | Schellhammer | Jan. 8, 1935 |
| 2,027,961 | Currie | Jan. 14, 1936 |
| 2,088,922 | Porteous | Aug. 3, 1937 |
| 2,290,333 | Johnson | July 21, 1942 |
| 2,359,952 | Welger | Oct. 10, 1944 |
| 2,457,908 | Meyerhoeffer | Jan. 4, 1949 |
| 2,478,326 | Scarth | Aug. 9, 1949 |
| 2,498,831 | Veitch | Feb. 28, 1950 |
| 2,608,501 | Kimble | Aug. 26, 1952 |

FOREIGN PATENTS

| | | |
|---|---|---|
| 320,534 | Italy | Aug. 24, 1934 |